Patented July 12, 1927.

1,635,193

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

METHOD OF ACCELERATING THE VULCANIZATION OF RUBBER AND PRODUCT THEREOF.

No Drawing. Original application filed April 4, 1924, Serial No. 704,159. Divided and this application filed September 16, 1926. Serial No. 135,992.

My invention relates to a method of vulcanizing rubber and rubber-like compositions, and it is particularly directed to a novel method of accelerating the vulcanizing process.

It has heretofore been suggested that certain thiazole compounds provide efficient accelerators for the vulcanization of rubber. These accelerators are especially desirable because of their power, since they possess an ability to promote the vulcanization of rubber much more rapidly than many accelerators now known. By reason of this ability, it is possible, if desired, to reduce the temperature of vulcanization, which has been found to improve the physical characteristics of the vulcanized rubber. Moreover, certain of the thiazoles also appear to improve the aging characteristics of rubber or rubber compounds, which, of course, is a particularly desirable feature.

In Patent No. 1,544,687, certain aryl thiazole compositions are enumerated which are particularly adapted for use in the accelerating process. It is the object of this invention to set forth a specific class of compositions falling within the broad class therein disclosed which is remarkably well adapted to be utilized as an accelerator of vulcanization.

The materials made the subject of the present invention are the mercapto dimethyl benzothiazoles and their derivatives, a specific embodiment of which is 1-mercapto 3-5-dimethyl benzothiazole and may be represented structurally as follows:

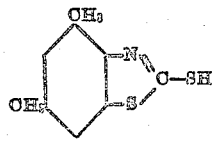

This material may be prepared conveniently by causing a salt of a xylyl-dithio-carbamate to react with sulphur at an elevated temperature and under relatively high pressures. A temperature of 250° C. and a pressure of from 1000 to 1200 pounds per square inch for the ammonium salt of the carbamate results in satisfactory yields. The product when pure is a yellow crystalline material whose melting point is about 250° C. The disulphide, which may readily be prepared by oxidizing the mercaptan, forms in needle-shaped crystals having a melting point of 193° C. These materials, as well as the metallic derivatives, such as the zinc and lead salts, are valuable accelerators of vulcanization.

When, for example, a rubber composition having the following ratio of ingredients 100 parts rubber, 5 parts zinc oxide, 3½ parts sulphur, 1 part accelerator is vulcanized with steam maintained at 40 pounds pressure, a satisfactory cured product whose breaking load is 182 kilograms per square centimeter is obtained in 10 minutes. When the same composition is subjected to steam at 20 pounds pressure for thirty minutes, a well cured product is obtained whose tensional strength at breaking load is 211 kilograms per square centimeter.

From the foregoing description, it will be apparent that the dimethyl benzothiazole derivatives are possessed of desirable accelerating properties. Moreover, it will likewise be apparent that although I have enumerated but a few derivatives of the dimethyl mercapto benzothiazole, the invention is not so limited, but is susceptible to numerous modifications without departing from its scope, and I desire that it be limited only to accord with the prior art and the appended claims.

The present application is a division of a prior application No. 704,159 filed Apr. 4, 1924, now patented as Serial No. 1,604,199.

What I claim is:

1. A method of accelerating the vulcanization of rubber that comprises vulcanizing the same in the presence of a 1-mercapto dimethyl benzothiazole, or a derivative thereof.

2. A method of accelerating the vulcanization of rubber that comprises vulcanizing the same in the presence of 1-mercapto-3-5-dimethyl benzothiazole, or a derivative thereof.

3. A method of accelerating the vulcanization of rubber that comprises vulcanizing the same in the presence of a metallic salt of 1-mercapto-3-5-dimethyl benzothiazole.

4. A method of accelerating the vulcanization of rubber that comprises vulcanizing the same in the presence of a bivalent metallic salt of 1-mercapto-3-5-dimethyl benzothiazole.

5. A method of accelerating the vulcanization of rubber that comprises vulcanizing the same in the presence of a zinc salt of 1-mercapto-3-5-dimethyl benzothiazole.

6. A method of accelerating the vulcanization of rubber that comprises vulcanizing the same in the presence of 1-mercapto-3-5-dimethyl benzothiazole disulphide.

7. A method of accelerating the vulcanization of rubber that comprises vulcanizing the same in the presence of 1-mercapto-3-5-dimethyl benzothiazole polysulphide.

8. A rubber product which has been vulcanized in the presence of a 1-mercapto dimethyl benzothiazole or a derivative thereof.

9. A rubber product which has been vulcanized in the presence of a 1-mercapto-3-5-dimethyl benzothiazole or a derivative thereof.

10. A rubber product which has been vulcanized in the presence of a metallic salt of 1-mercapto-3-5-dimethyl benzothiazole.

In witness whereof I have hereunto signed my name.

LORIN B. SEBRELL.